(12) United States Patent
Ishikawa et al.

(10) Patent No.: US 12,072,591 B2
(45) Date of Patent: Aug. 27, 2024

(54) LIQUID CRYSTAL DISPLAY DEVICE

(71) Applicant: Japan Display Inc., Tokyo (JP)

(72) Inventors: Tomokazu Ishikawa, Tokyo (JP); Masaru Nakakomi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/517,038

(22) Filed: Nov. 22, 2023

(65) Prior Publication Data

US 2024/0176197 A1 May 30, 2024

(30) Foreign Application Priority Data

Nov. 25, 2022 (JP) .................... 2022-188369

(51) Int. Cl.
*G02F 1/1333* (2006.01)
*G02F 1/1339* (2006.01)
*G02F 1/1343* (2006.01)
*G02F 1/1362* (2006.01)
*G02F 1/1368* (2006.01)

(52) U.S. Cl.
CPC .. *G02F 1/136227* (2013.01); *G02F 1/133345* (2013.01); *G02F 1/133357* (2021.01); *G02F 1/13398* (2021.01); *G02F 1/136209* (2013.01); *G02F 1/136222* (2021.01);
(Continued)

(58) Field of Classification Search
CPC ............. G02F 1/1333; G02F 1/133345; G02F 1/133357; G02F 1/1335; G02F 1/133512; G02F 1/133514; G02F 1/1339; G02F 1/13394; G02F 1/13398; G02F 1/1343; G02F 1/134309; G02F 1/134318; G02F 1/134363; G02F 1/1362; G02F 1/136209; G02F 1/136222; G02F 1/136227; G02F 1/136286; G02F 1/1368
See application file for complete search history.

(56) References Cited

U.S. PATENT DOCUMENTS

| 2013/0057820 | A1* | 3/2013 | Hyodo | ................. G02F 1/1337 349/155 |
| 2022/0308377 | A1 | 9/2022 | Ozeki et al. | |
| 2022/0326581 | A1* | 10/2022 | Kimura | ............ G02F 1/136213 |

FOREIGN PATENT DOCUMENTS

| CN | 106773365 A | * | 5/2017 | ........... G02F 1/1333 |
| JP | 2019-120761 A | | 7/2019 | |

(Continued)

OTHER PUBLICATIONS

Patent Translate CN 106773365 (May 31, 2017).*

*Primary Examiner* — Thoi V Duong
(74) *Attorney, Agent, or Firm* — Maier & Maier, PLLC

(57) ABSTRACT

A liquid crystal display device includes a thin film transistor (TFT) substrate and a counter substrate that are disposed opposite to each other with a liquid crystal layer in between. The TFT substrate has, an organic passivation film formed covering the TFT, and a pixel electrode and a common electrode formed on the organic passivation film, the organic passivation film having a through-hole to connect the pixel electrode and the TFT. A columnar spacer is formed on the counter substrate to define a distance between the TFT substrate and the counter substrate. A planarization film made of resin is formed in the through-hole. A recess is formed in the through-hole by a surface of the planarization film and a sidewall of the through-hole. A tip end of the columnar spacer exists in the recess.

13 Claims, 13 Drawing Sheets

(52) U.S. Cl.
CPC ........ *G02F 1/1368* (2013.01); *G02F 1/13394* (2013.01); *G02F 1/134318* (2021.01); *G02F 1/134363* (2013.01)

(56) References Cited

FOREIGN PATENT DOCUMENTS

| | | | |
|---|---|---|---|
| JP | 2019-174736 A | 10/2019 | |
| JP | 2022-153055 A | 10/2022 | |
| WO | WO-2021171714 A1 * | 9/2021 | ......... G02F 1/13394 |

* cited by examiner

LIQUID CRYSTAL DISPLAY DEVICE

CLAIM OF PRIORITY

The present application claims priority from Japanese patent application JP 2022-188369 filed on Nov. 25, 2022, the content of which is hereby incorporated by reference into this application.

BACKGROUND

The present invention relates to a high-definition liquid crystal display device.

In a liquid crystal display device, a TFT substrate, on which pixels having pixel electrodes and thin-film transistors (TFT), etc. are formed in a matrix, and a counter substrate opposite the TFT substrate are disposed, and liquid crystal is sandwiched between the TFT substrate and the counter substrate. An image is formed by controlling transmittance of light from a backlight with liquid crystal molecules for each pixel.

The liquid crystal display device is also used for a display device that requires a high-definition screen, such as a virtual reality (VR) display device (hereinafter also referred to as VR). The high-definition screen inevitably has a small pixel pitch, leading to a problem of light transmittance of a pixel. Japanese Unexamined Patent Application Publication No. 2022-153055 describes a configuration where a transparent oxide semiconductor is used for an interconnection within a pixel to suppress a decrease in light transmittance at the pixel. Japanese Unexamined Patent Application Publication No. 2022-153055 describes a configuration where a columnar spacer is disposed from a TFT substrate side toward a counter substrate side in a through-hole portion, which is formed in an organic passivation film to connect TFT and a pixel electrode, to save pixel area.

The columnar spacer is typically used to maintain a space between the TFT substrate and the counter substrate. However, a typical columnar spacer cannot suppress horizontal displacement between the TFT substrate and the counter substrate. Japanese Unexamined Patent Application Publication No. 2019-174736 and Japanese Unexamined Patent Application Publication No. 2019-120761 each describes a configuration where a recess is formed on a TFT substrate side with a columnar spacer formed on the counter substrate, and the tip end of the columnar spacer is fitted into the recess to prevent lateral displacement between the TFT substrate and the counter substrate.

SUMMARY

Higher definition of the liquid crystal display device causes a problem of light transmittance of a liquid crystal display panel. Specifically, elements such as TFT, an interconnection, and a through-hole for connection cannot be omitted from each pixel, and thus light transmission region for image formation is inevitably reduced. On the other hand, as a pixel pitch becomes smaller, parallel displacement (hereinafter also referred to as lateral displacement) between the TFT substrate and the counter substrate is more likely to have an impact. In other words, even the amount of lateral displacement, which has been not matter in the past, may become a problem at a smaller pixel pitch.

An object of the invention is to achieve a high-definition liquid crystal display device with a small pixel pitch, which can suppress a decrease in transmittance and can suppress lateral displacement between the TFT substrate and the counter substrate.

The invention is to overcome the above problem, and specifically achieves the object as follows.

(1) A liquid crystal display device, including a thin film transistor (TFT) substrate and a counter substrate that are disposed opposite to each other with a liquid crystal layer in between, the TFT substrate having, an organic passivation film formed covering the TFT including a semiconductor film, a gate electrode, a drain electrode, and a source electrode, and a pixel electrode and a common electrode formed on the organic passivation film, the organic passivation film having a through-hole to connect the pixel electrode and the TFT, where a columnar spacer is formed on the counter substrate to define a distance between the TFT substrate and the counter substrate, a planarization film made of resin is formed in the through-hole, a recess is formed in the through-hole by a surface of the planarization film and a sidewall of the through-hole, and a tip end of the columnar spacer exists in the recess.

(2) The liquid crystal display device according to (1), where the columnar spacer is in contact with the recess.

(3) The liquid crystal display device according to (1), where diameter of the recess is larger than diameter of the columnar spacer in plan view.

(4) The liquid crystal display device according to (1), where the planarization film exists also outside the through-hole, and thickness of the planarization film inside the through-hole is greater than thickness of the planarization film outside the through-hole.

(5) The liquid crystal display device according to (1), where the columnar spacer, the planarization film, the through-hole, the gate electrode, and the semiconductor film overlap one another in plan view.

DESCRIPTION OF THE PREFERRED EMBODIMENTS

Hereinafter, the contents of the invention will be described in detail with some embodiments. Liquid crystal display devices include a pixel electrode top type and a common electrode top type depending on a vertical relationship between a pixel electrode and a common electrode. Although color filters have been often formed on the counter substrate in the past, the color filters may be formed on a TFT substrate in a high-definition liquid crystal display device. This type is referred to as color filter on array (COA). The invention can be applied to either of these types.

First Embodiment

Figure 1:
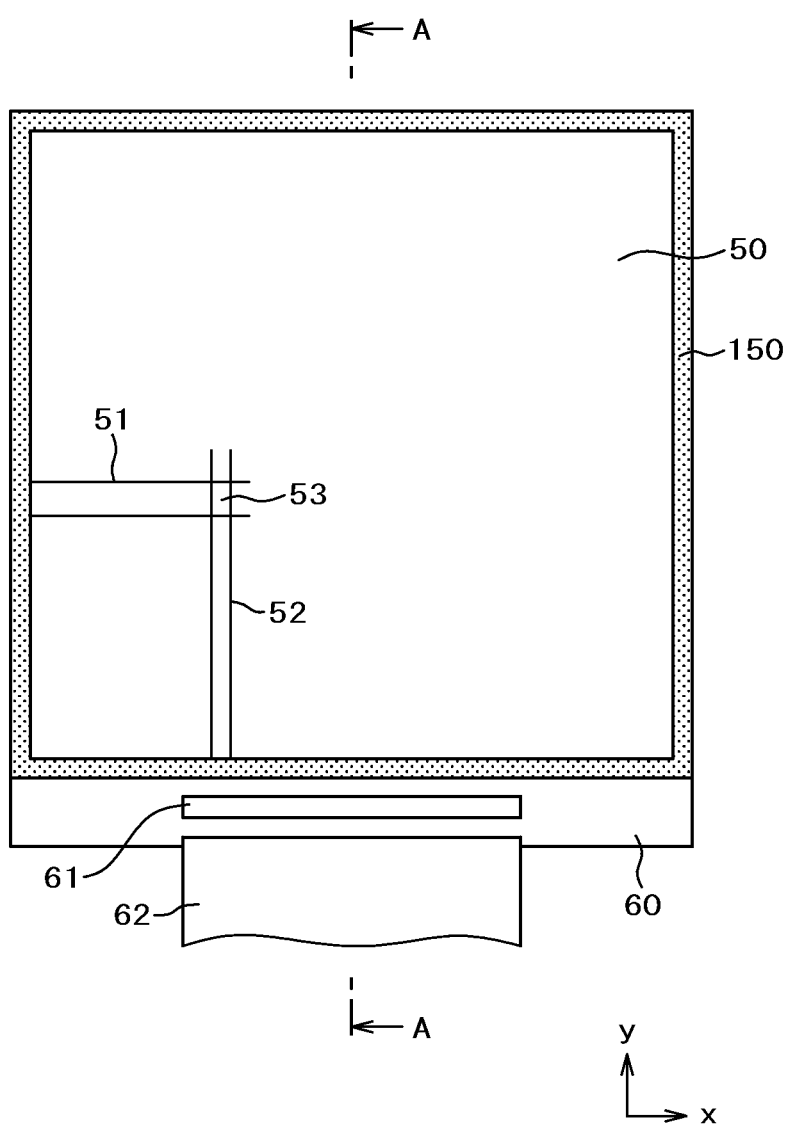
FIG. 1 is a plan view of a liquid crystal display device.
Figure 2:
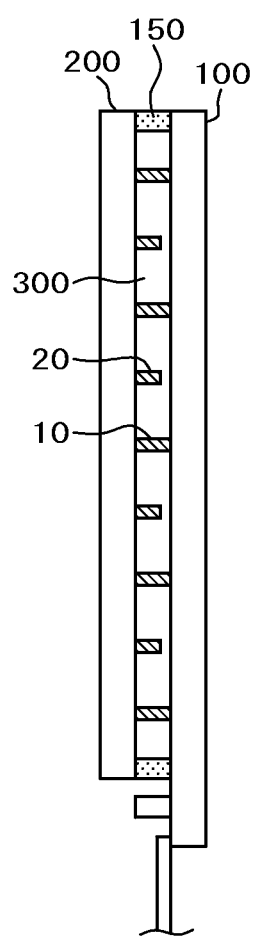
FIG. 2 is a cross sectional diagram along a line A-A in FIG. 1.

FIG. 1 is a plan view of a liquid crystal display device, and FIG. 2 is a cross sectional diagram along a line A-A in FIG. 1. In FIGS. 1 and 2, a TFT substrate 100 and a counter substrate 200 are bonded together with a sealant 150 therebetween at their peripheries, and a liquid crystal layer 300 is sealed in the inside. A display region 50 is formed in a region where the TFT substrate 100 overlaps the counter substrate 200. On the TFT substrate 100 in the display area 50, scanning lines 51 extend in the horizontal direction (x direction) and are arranged in the vertical direction (y direction). Video signal lines 52 extend in the vertical direction and are arranged in the horizontal direction. A pixel 53 is formed in a region enclosed by the scanning lines 51 and the video signal lines 52.

The TFT substrate 100 is formed larger than the counter substrate 200, and provides a terminal region 60 being a portion where the TFT substrate 100 does not overlap with the counter substrate 200. The terminal region 60 is connected to a flexible wiring board 62 for supplying power and signals to the liquid crystal display device. A driver IC 61 for forming video signals, etc. is also disposed in the terminal region 60. For the terminal region 60 having small area, the driver IC 61 may be mounted on the flexible wiring board side.

A distance between the TFT substrate 100 and the counter substrate 200, i.e., thickness of the liquid crystal layer 300, needs to be kept constant over the entire display region. In FIG. 2, therefore, columnar spacers 10 and 20 are disposed on the counter substrate 200 side to maintain the distance between the TFT substrate 100 and the counter substrate 200. The columnar spacers may be formed on the TFT substrate 100 side.

The columnar spacers include main columnar spacers 10 and sub-columnar spacers 20. The main columnar spacer 10 defines the distance between the TFT substrate 100 and the counter substrate 200 in the normal state. The sub-columnar spacer 20 is formed with a lower height than the main columnar spacer 10. The sub columnar spacer 20 is not in contact with the TFT substrate 100 in the normal state, but comes into contact with the TFT substrate 100 when pressing force is applied to the counter substrate 200 or the TFT substrate 100, and thus prevents the gap between the TFT substrate 100 and the counter substrate 200 from becoming extremely small. The diameter of the sub-columnar spacer 20 is larger than the diameter of the main columnar spacer 10, and the number of the sub-columnar spacers 20 is greater than the number of the main columnar spacers 10.

In FIG. 1, a scanning signal drive circuit to generate a scanning signal is formed in a frame portion on either side of the display region 50. In the first embodiment, oxide semiconductor TFT is used for TFT in the display region 50, and polysilicon semiconductor TFT is used in the peripheral drive circuit. Polysilicon semiconductor has higher mobility than oxide semiconductor, and is thus suitable for forming the peripheral circuit. On the other hand, TFT using the oxide semiconductor has a smaller mobility than TFT using the polysilicon semiconductor, but exhibits a smaller leakage current than the TFT using the polysilicon semiconductor, and is thus suitable for a switching element in a pixel.

Figure 3:
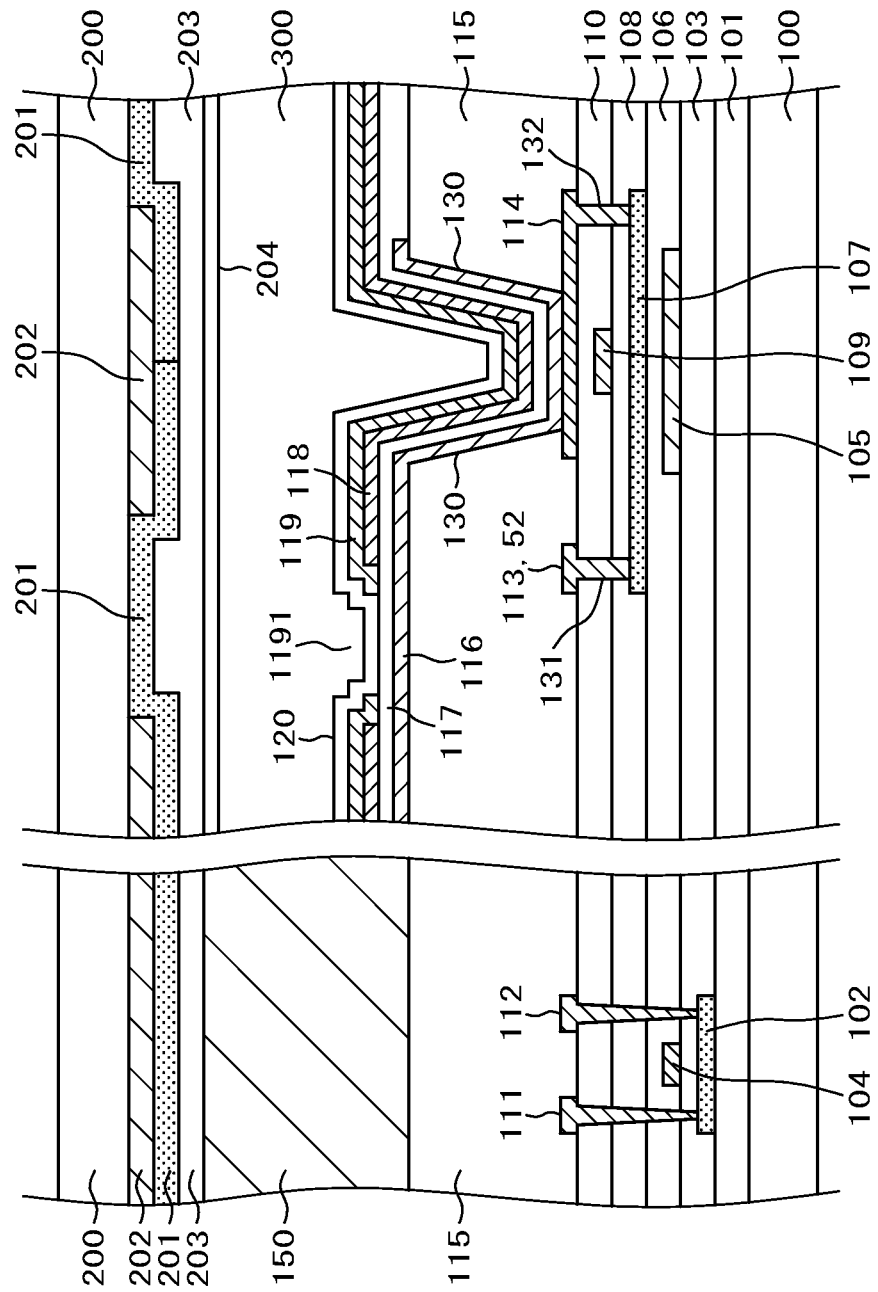
FIG. 3 is a cross sectional view of a display region of a liquid crystal display device according to a comparative example.

FIG. 3 includes a cross sectional view of a pixel region having the oxide semiconductor TFT and a cross sectional view of a peripheral circuit, having the polysilicon semiconductor TFT, formed in the frame region in a liquid crystal display device according to a comparative example. In FIG. 3, the left side shows the cross sectional view of the peripheral drive circuit, and the right side shows the cross sectional view of the pixel region. Since both the pixel region and the peripheral drive circuit are formed in the same process, the same layer is designated by the same reference numeral in both the peripheral circuit region and the pixel region. In the peripheral drive circuit, details of the circuit are omitted, and only the TFT using a polysilicon semiconductor 102 used in the circuit is shown.

In FIG. 3, a base film 101 is formed on a TFT substrate 100 formed of glass, for example. The base film 101 prevents impurities from the TFT substrate 100 and the like from contaminating the polysilicon semiconductor 102 or an oxide semiconductor film 107. The base film 101 typically has a two-layer structure of a silicon nitride layer (hereinafter also referred to as SiN layer) and a silicon oxide layer (hereinafter also referred to as SiO).

A polysilicon semiconductor film 102 is formed on the base film 101 in the peripheral drive circuit. With the polysilicon semiconductor film 102, an a-Si film is initially formed, and then the a-Si is converted into polysilicon by an excimer laser. The base film 101 and the a-Si film are successively formed by chemical vapor deposition (CVD).

A first gate insulating film 103 is formed over the polysilicon semiconductor film 102. The first gate insulating film 103 is an SiO film made from tetraethoxysilane (TEOS) as a source material. A first gate electrode 104 is formed on the first gate insulating film 103. The first gate electrode 104 is formed of MoW, Ti, a stacked film of Ti—Al—Ti, or the like. On the pixel side, first light shielding films 105 are formed of the same material and by the same process as for the first gate electrode 104. The first light shielding films 105 extend in the same direction as scanning lines 51 in FIG. 1 and are arranged in the same direction as the scanning lines 51. The first light shielding film 105 covers the oxide semiconductor TFT, a through-hole 130, and the like from the underside to block light from a backlight.

A cross-sectional structure of the pixel is now described. A first interlayer insulating film 106 is formed covering the first light-shielding film 105. The first interlayer insulating film 106 has a two-layer structure, with the lower layer being a SiN layer and the upper layer being an SiO layer. This prevents oxygen from being extracted from the oxide semiconductor film 107 formed on the first interlayer insulating film 106. The oxide semiconductor film 107 on the first interlayer insulating film 106 forms a channel of the TFT under a second gate electrode 109.

A second gate insulating film 108 is formed covering the oxide semiconductor film 107. The second gate insulating film 108 is formed of two SiO layers. A portion of the oxide semiconductor film 107 corresponding to a channel part includes an oxygen-rich, first SiO layer, and other portions thereof include a dense, second SiO layer. The first SiO layer is the oxygen-rich film to allow oxygen to be supplied to the oxide semiconductor film 107.

The second gate electrode 109 is formed on the second gate insulating film 108. The second gate electrode 109 can be made of the same material as the first gate electrode 104. Although FIG. 3 shows a top-gate TFT in which the channel part of the TFT is formed under the second gate electrode 109, a dual-gate-type TFT can also be formed if a gate voltage is applied to the first light shielding film 105.

A second interlayer insulating film 110 is formed covering the second gate electrode 109. The second interlayer insulating film 110 also often has a two-layer structure of a SiN layer and a SiO layer. The SiO layer is often the lower layer. This is to prevent oxygen from being extracted from the oxide semiconductor film 107.

After forming the second interlayer dielectric 110, a first drain electrode 111 and a second source electrode 112 are formed in the peripheral circuit by forming through-holes through the four insulating-film layers: the first gate insulating film 103, the first interlayer insulating film 106, the second gate insulating film 108, and a second interlayer insulating film 110. At the same time, in the pixel region, a through-hole 131 is formed through the second gate insulating film 108 and the second interlayer insulating film 110 to form a second drain electrode 113, and a through-hole 132 is also formed therethrough to form a second source electrode 114. The first drain electrode 111, a first source electrode 112, and the second drain electrode 113 are formed of metal, but the second source electrode 114 being a transparent electrode is formed of indium tin oxide (ITO) and is connected to a pixel electrode 116. In the through-hole 131, the video signal line 52 serves as a drain electrode 113 and is connected to the oxide semiconductor film 107 that has been made conductive. The video signal line 52 can be formed of a material, such as MoW, Ti, or a stacked film of Ti—Al—Ti, as with the first gate electrode 104 and the like.

An organic passivation film 115 is formed covering the drain electrodes 111 and 113, the source electrodes 112 and 114, and the second interlayer insulating film 110. The organic passivation film 115 is formed thick, 2 to 4 μm, to serve as a planarization film and to suppress capacitive coupling between the video signal line 52 and the pixel electrode 116 or a common electrode 119.

Since the configuration of FIG. 3 is a common electrode top configuration, the pixel electrode 116 is formed of a transparent conductive film, ITO, on the organic passivation film 115. The pixel electrode 116 has a rectangular shape in accordance with a pixel shape. A through-hole 130 is formed in the organic passivation film 115 to connect the pixel electrode 116 and the source electrode 114.

In FIG. 3, a capacitive insulating film 117 is formed on the pixel electrode 116, a second light shielding film 118 is formed of metal on the capacitive insulating film 117, and a common electrode 119 is formed of ITO on the second light shielding film 118. The capacitance insulating film 117 configures a pixel capacitance formed between the pixel electrode 116 and the common electrode 119 and is thus called capacitance insulating film. The capacitance insulating film 117 is formed of SiN having a high dielectric constant. The second light shielding film 118 and the common electrode 119 are formed over the capacitive insulating film 117.

The second light shielding film 118 is formed of metal, such as molybdenum (Mo), titanium (Ti), aluminum (Al), or the like. The second light shielding film 118 blocks unnecessary light from the backlight to improve image contrast. Although a black matrix 202 having a light shielding effect is formed on the counter substrate 200 in the configuration of FIG. 3, disposition of the second light shielding film 118 can further improve the image contrast. However, since formation of the second light shielding film 118 reduces light transmittance, the second light shielding film 118 may not be provided when the black matrix 202 exists on the counter substrate 200. Alternatively, the second light shielding film 118 may be used with its shape changed for preventing a voltage drop in the common electrode 119 rather than for the light shielding effect.

The common electrode 119 is formed of ITO. Since ITO has a relatively high resistance, the second light-shielding film 118 formed of metal is stacked to lower the resistance, so that image uniformity can be maintained. The common electrode 119 is formed in common to multiple pixels, and has a slit 1191 for each pixel.

A first alignment film 120 is formed covering the common electrode 119. The first alignment film 120 defines initial alignment of liquid crystal molecules together with a second alignment film 204 formed on the counter substrate 200 side. The alignment films 120 and 204 are formed of polyimide. Alignment treatment of the alignment films 120 and 204 may be performed by a rubbing method or may be photo-alignment treatment with polarized ultraviolet rays.

When a voltage is applied to the pixel electrode 116, lines of electric force are generated in the slit 1191 of the common electrode 119 so as to pass through the liquid crystal layer 300 from the pixel electrode 116 toward the common electrode 119, and rotate the liquid crystal molecules to change transmittance of the liquid crystal layer 300. The transmittance of the liquid crystal layer 300 is changed for each pixel to form an image. In other words, in plane switching (IPS) operation is performed.

Pixel area is extremely small in the first embodiment. On the other hand, since the organic passivation film 115 cannot be formed with small thickness, the through-hole 130 is also difficult to be formed small. In FIG. 3, therefore, a through-hole 130 is formed through the organic passivation film 115 directly above the TFT to save space.

In FIG. 3, the counter substrate 200 is disposed across the liquid crystal layer 300. A color filter 201 and the black matrix 202 are formed on the counter substrate 200. The color filter 201 is to form a color image, and the black matrix 202 is to improve image contrast. An overcoat film 203 is formed covering the color filter 201 and the black matrix 202. The overcoat film 203 prevents color pigments in the color filter 201 from seeping into the liquid crystal layer 300. A second alignment film 204 is formed covering the overcoat film 203. The role of the second alignment film 204 is the same as that of the first alignment film 120 described above.

Figure 4:
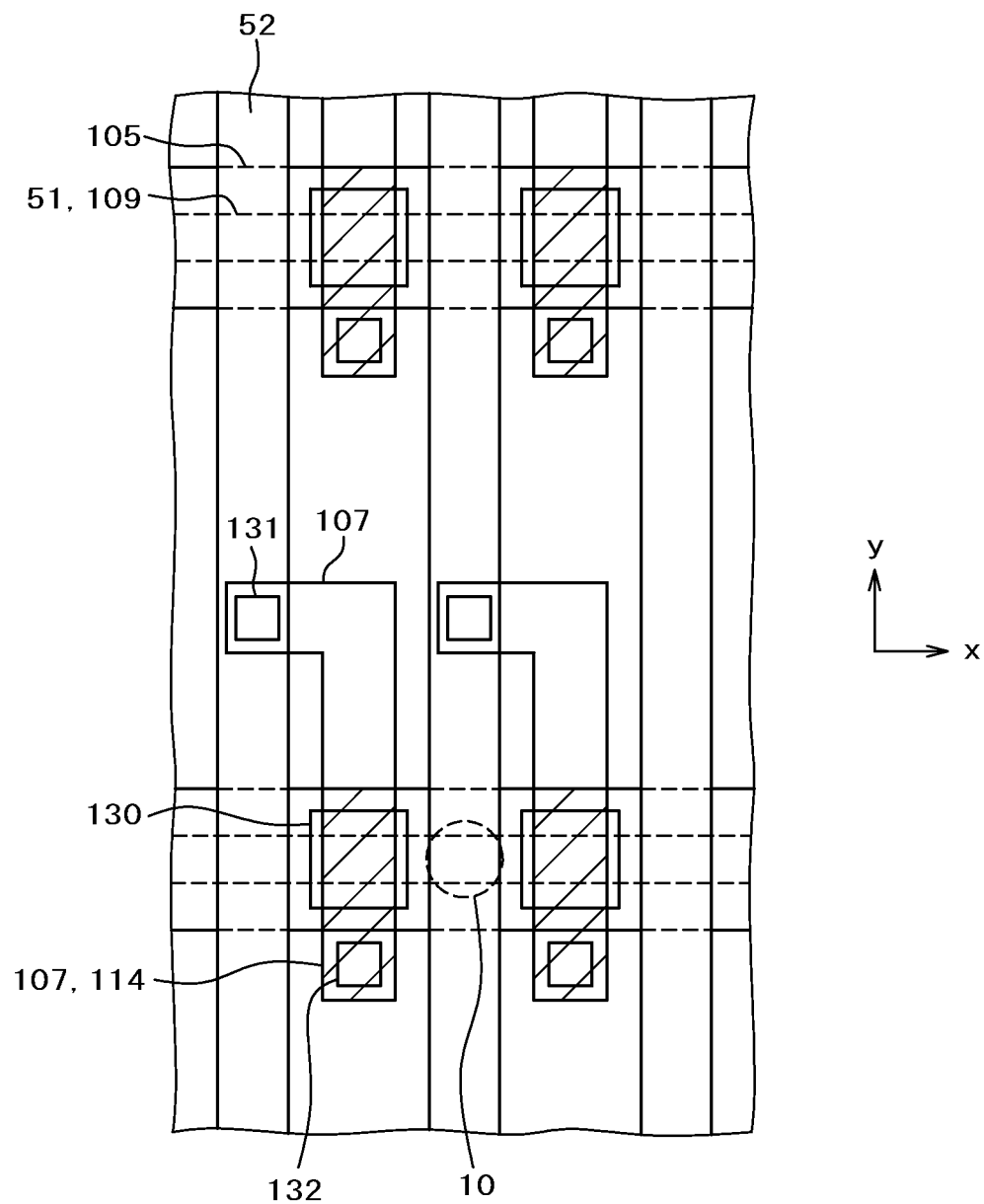
FIG. 4 is a plan diagram showing a state before formation of a through-hole in an organic passivation film, in the liquid crystal display device corresponding to FIG. 3.

FIG. 4 is a plan diagram showing a state before formation of the through-hole 130 in the organic passivation film 115 on the TFT substrate 100 side in FIG. 3. In FIG. 4, the first light-shielding films 105 and the scanning lines 51 (second gate electrodes 109) extend in the horizontal direction (x-direction) and are arranged in the vertical direction (y-direction). Video signal lines 52 extend in the vertical direction and are arranged in the horizontal direction. In FIG. 4, the TFT is formed above the first light-shielding film 105. In other words, the TFT and the like are shielded from the backlight. The dotted circle in FIG. 4 indicates a position of the columnar spacer 10 when the counter substrate 200 is aligned with the TFT substrate 100.

In FIG. 4, the oxide semiconductor film 107 serving as a drain interconnection extends vertically within the pixel from the through-hole 131 formed on the video signal line 52 toward the scanning line 51 (second gate electrode 109) side. The oxide semiconductor film 107 is made conductive and is transparent, and thus does not significantly reduce light transmittance.

In FIG. 4, the oxide semiconductor film 107 further extends to the lower side and is connected to the source electrode 114 formed of ITO in the through-hole 132. The source electrode 114 extends to the upper side in the y direction and is connected to the pixel electrode 116 shown in FIG. 5 in the through-hole 130. In FIG. 4, the source electrode 114 being hatched overlaps the oxide semiconductor film 107 in plan view.

The columnar spacer 10 with a circular cross section is formed between the through-holes 130, i.e., on the video signal line, to maintain the distance between the TFT substrate 100 and the counter substrate 200. FIG. 4 shows the position of the columnar spacer 10 by the dotted circle.

Figure 5:
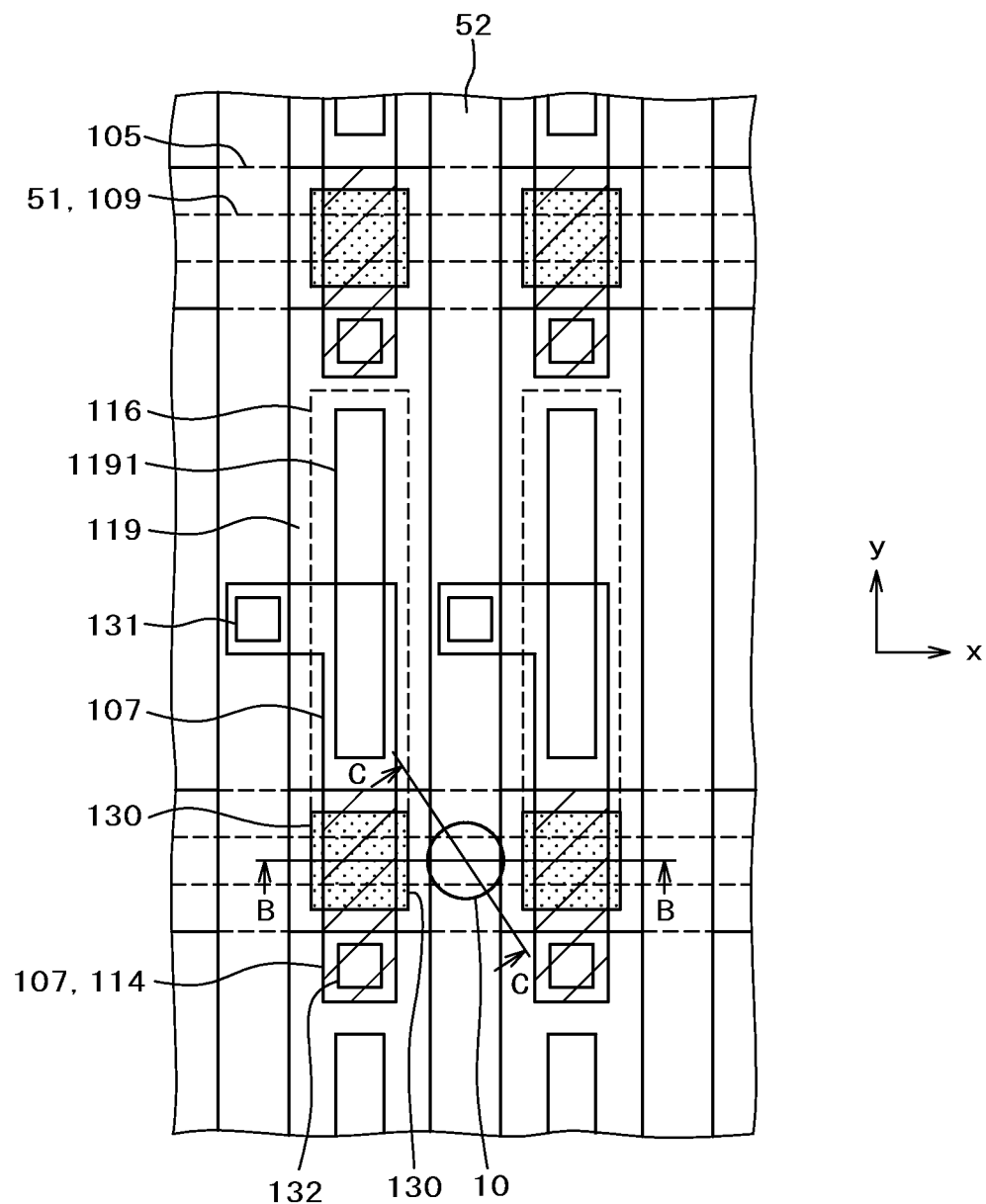
FIG. 5 is a plan diagram showing a state where a pixel electrode and a common electrode are added to FIG. 4.

FIG. 5 is a plan diagram showing a state where the pixel electrode 116 and the common electrode 119 are added to the configuration of FIG. 4. The pixel electrode 116 is formed in a rectangular shape in accordance with the pixel shape. The common electrode 119 is formed in common to multiple pixels, and the slit 1191 is formed at a position overlapping a position of the pixel electrode 116.

The pixel electrode 116 is connected to the source electrode 114 in the through-hole 130. When a voltage is applied to the pixel electrode 116, lines of electric force are generated between the pixel electrode 116 and the common electrode 119 in the slit 1191, and rotate the liquid crystal molecules to control light transmittance of the pixel.

In FIG. 5, a columnar spacer 10 with a circular cross section, which is formed on the counter substrate 200 to maintain the distance between the TFT substrate 100 and the counter substrate 200, is disposed between the through-holes 130, i.e., on the video signal line 52. The columnar spacer 10 is the main columnar spacer 10 formed on the counter substrate 200, and is in contact with the TFT substrate 100 side in the normal state. The columnar spacers further include the sub-columnar spacer 20. The sub-columnar spacer 20 is not in contact with the TFT substrate 100 side in the normal state, but comes into contact with the TFT substrate 100 side when pressing force is applied to the counter substrate 200 or the like. The columnar spacers 10 or 20 are not disposed at every pixel, but at every few pixels. In a high-definition screen, disposed positions of the columnar spacers 10 and 20 each become a problem. The main columnar spacer 10 is representatively described below.

Figure 6:
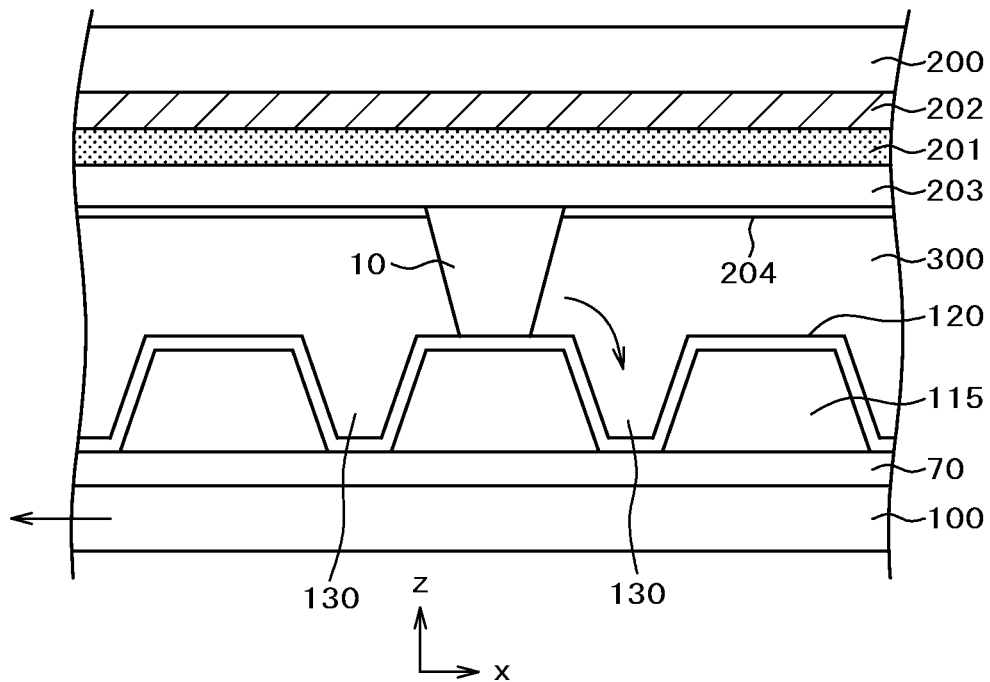
FIG. 6 is a cross sectional diagram showing a problem of the comparative example.

FIG. 6 is a cross sectional diagram along a line B-B in FIG. 5, showing a problem when the TFT substrate 100 and the counter substrate 200 are displaced from each other in the lateral direction (x direction). In FIG. 6, the cross section of the TFT substrate 100 is omitted. A TFT circuit layer 70 on the TFT substrate 100 includes TFTs, scanning lines, video signal lines, and the like. The organic passivation film 115 is formed on the TFT circuit layer 70. In FIG. 6, the pixel electrode 116 and the common electrode 119 are omitted, and the alignment film 120 is formed on the organic passivation film 115.

In FIG. 6, the color filter 201, the black matrix 202, the overcoat film 203, and the alignment film 204 are formed on the counter substrate 200, and the columnar spacer 10 is formed on the overcoat film 203. The columnar spacer 10 is disposed in a space between the through-holes 130 formed in the organic passivation film 115, and the space cannot be formed large because of a small pixel pitch.

For example, as shown in FIG. 6, when the TFT substrate 100 moves to the left in the x direction with respect to the counter substrate 200 as indicated by an arrow, the columnar spacer 10 formed on the counter substrate 200 falls into the through-hole 130, and thus an appropriate distance between the TFT substrate 100 and the counter substrate 200 cannot be maintained.

Figure 7:
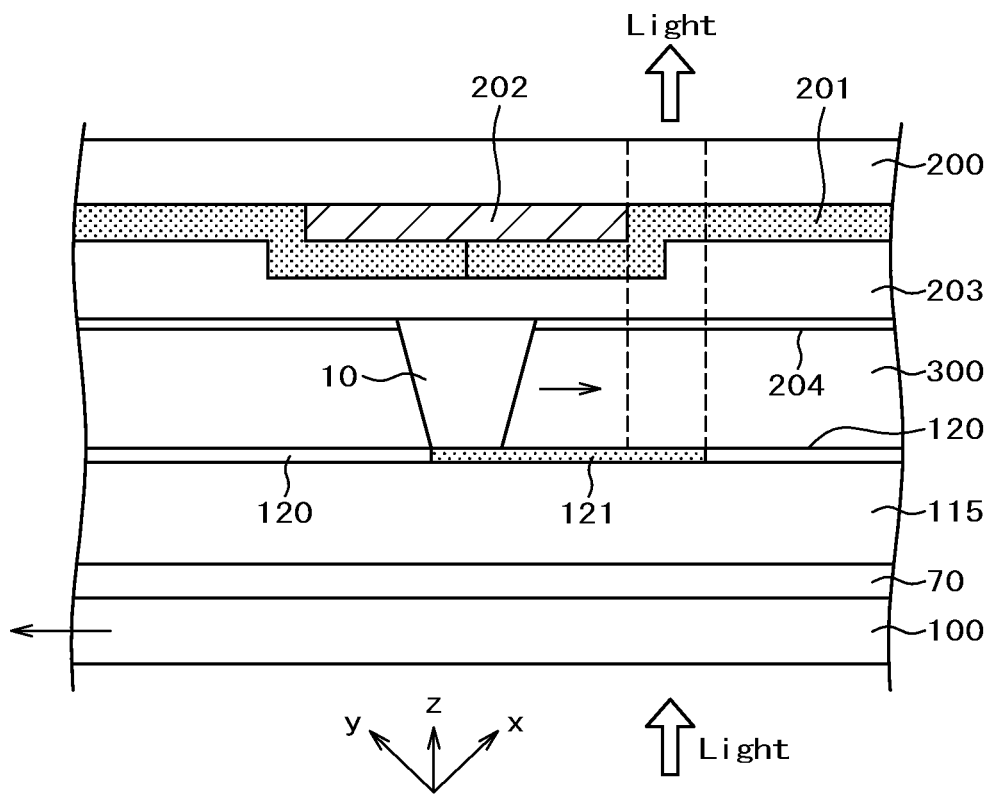
FIG. 7 is a cross sectional diagram showing another problem of the comparative example.

FIG. 7 is a cross sectional diagram along the line C-C in FIG. 5, showing a problem when the TFT substrate 100 and the counter substrate 200 are displaced in a diagonal direction, i.e., at an angle with respect to each of the x and y directions. In FIG. 7, the cross section of the TFT substrate 100 is omitted as in FIG. 6. In FIG. 7, however, no through-hole 130 is formed in the organic passivation film 115. On the counter substrate 200 side in FIG. 7, the black matrix 202 as a light shielding film is formed covering a region, in which the columnar spacer 10 is formed, and the periphery of the region, and a color filter 201 is formed in any other region.

For example, as shown in FIG. 7, when the TFT substrate 100 moves with respect to the counter substrate 200 at a certain angle with respect to the x direction as indicated by the arrow, that is, in the diagonal direction in FIG. 5, the columnar spacer 10 formed on the counter substrate 200 relatively moves to the right in FIG. 7 and eventually to the outside of an area covered with the black matrix 202. A portion 121 rubbed by the columnar spacer 10 of the alignment film 120 deteriorates in alignment characteristics and thus cannot align the liquid crystal molecules. Consequently, light leakage occurs in the portion.

If width of the black matrix 202 can be made large enough, there is no problem. However, at higher definition, the pixel pitch becomes smaller, and thus the width of the black matrix 202 is less likely to be made large enough. As a result, as shown in FIG. 7, even after the displacement between the TFT substrate 100 and the counter substrate 200 is resolved and the columnar spacer 10 returns to its normal position, a region having a deteriorated alignment film 120 exists beyond the black matrix 202. Consequently, light leakage occurs even in the normal state as indicated by the white arrow. This reduces image contrast.

Figure 8:
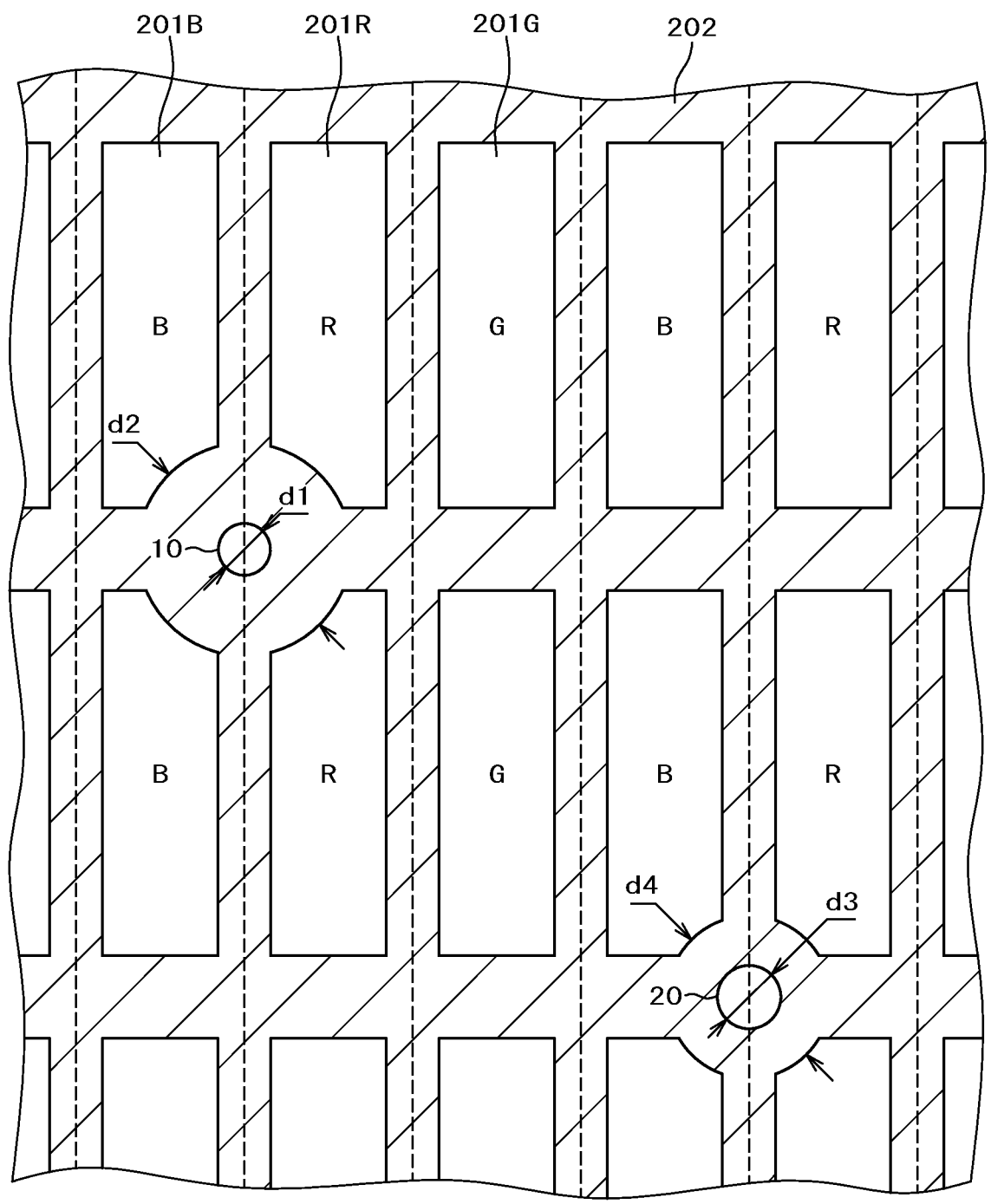
FIG. 8 is a cross sectional diagram showing further problem of the comparative example.

FIG. 8 shows, in the comparative example, another countermeasure against the phenomenon of movement of the columnar spacer 10 due to displacement between the TFT substrate 100 and the counter substrate 200 caused by pressing force or the like. In FIG. 8, red color filters 201R, green color filters 201G, and blue color filters 201B are arranged in the vertical direction (x direction). The black matrix 202 is formed in a grid shape between the color filters 201 and the counter substrate 200.

In FIG. 8, width of the black matrix 202 is larger in a portion, in which the columnar spacer 10 is formed, in anticipation of displacement between the TFT substrate 100 and the counter substrate 200 due to pressing force or the like. In FIG. 8, the main columnar spacer 10 and the sub-columnar spacer 20 are respectively formed between red color filter 201R columns and blue color filter 201B columns at different locations. The diameter d3 of the sub-columnar spacer 20 is larger than the diameter d1 of the main columnar spacer 10. On the other hand, the diameter d2 of the black matrix corresponding to the main columnar spacer 10 is larger than the diameter d4 of the black matrix corresponding to the sub-columnar spacer 20. This is because when the counter substrate 200 or the like receives pressing force, the amount of displacement of the main columnar spacer 10 is larger than the amount of displacement of the sub-columnar spacer 20.

In any case, width of the black matrix 202 must be increased in the region where the columnar spacer 10 or 20 is formed, and thus light transmittance of the pixel is reduced in that region. In other words, screen luminance decreases.

Figure 9:
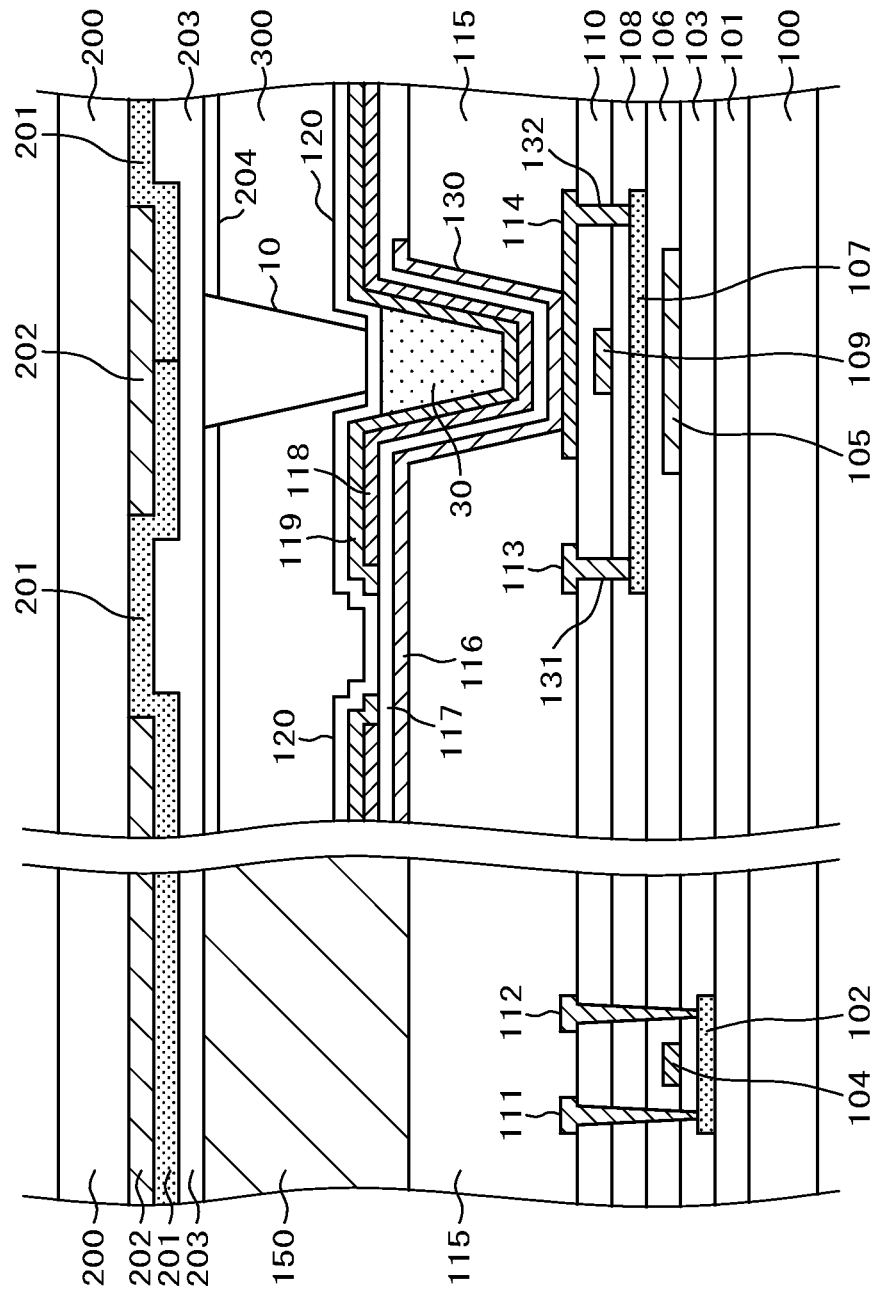
FIG. 9 is a cross sectional view of a liquid crystal display device according to a first embodiment.
Figure 10:
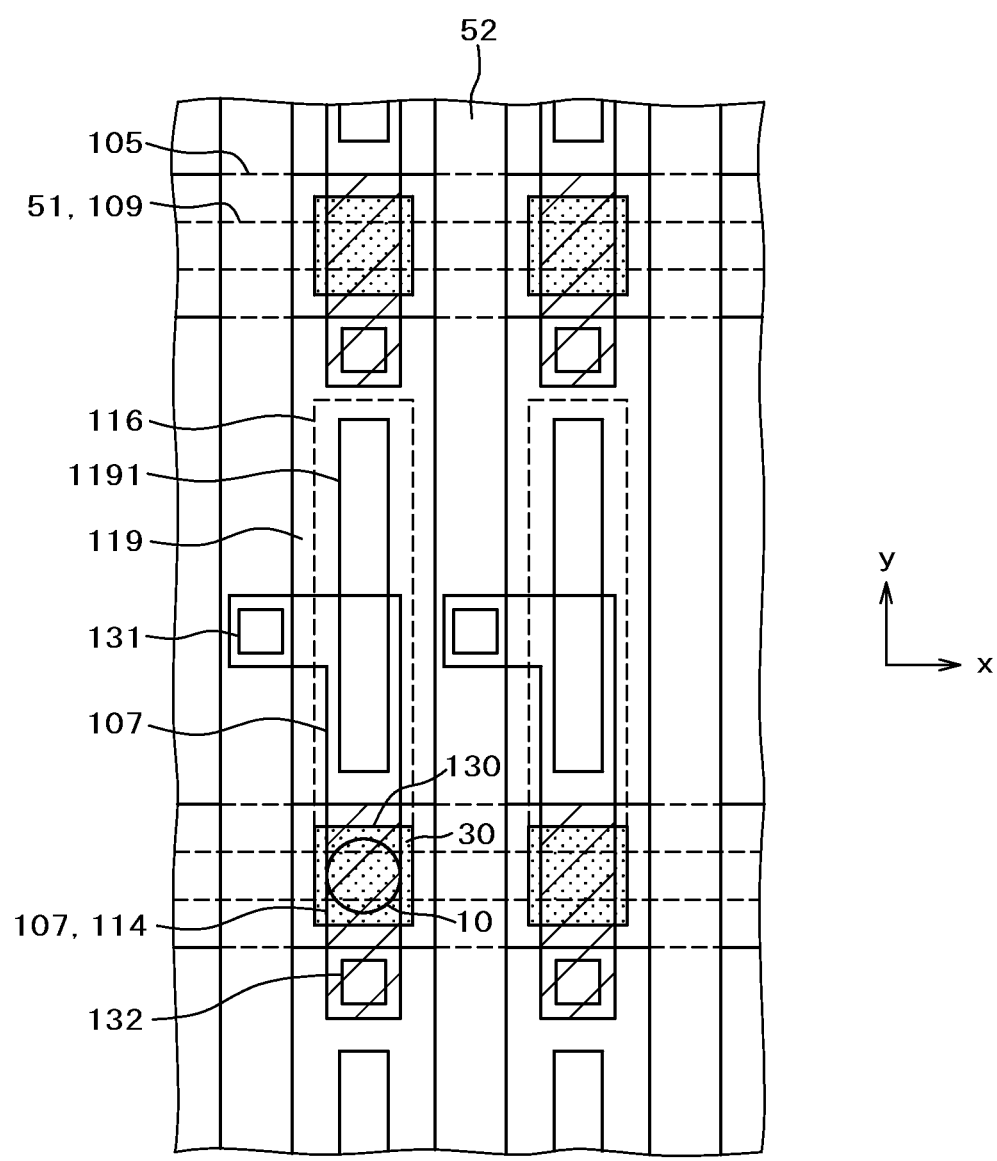
FIG. 10 is a plan diagram corresponding to FIG. 9.

FIG. 9 is a cross sectional diagram, showing a measure against the above problem in the invention. FIG. 10 is a plan diagram corresponding to FIG. 9. FIG. 9 differs from FIG. 3 in the comparative example in that the planarization film 30 is formed in the through-hole 130 and the columnar spacer 10 is moved to a position corresponding to the through-hole 130. In FIG. 9, after the common electrode 119 is formed in the through hole 130, the planarization film 30 is formed in the through-hole 130. Although various resins can be used for the planarization film 30, the same material as the organic passivation film 115 may be used. The planarization film 30 is not formed up to the upper end of the through-hole 130, but rather a recess is formed in an upper portion of the through-hole 130. It can also be said that the recess is configured by the surface of the planarization film 30 and the inner wall of the through-hole 130. The columnar spacer 10 is disposed within the recess.

In the configuration of FIG. 9, when the TFT substrate 100 begins to displace laterally with respect to the counter substrate 200, the columnar spacer 10 comes into contact with a wall of the recess, causing an effect of suppressing the displacement of the TFT substrate 100 with respect to the counter substrate 200. Furthermore, the configuration of FIG. 9 eliminates the need of extremely large height of the columnar spacer 10.

FIG. 10 is a plan diagram corresponding to FIG. 9. FIG. 9 differs from FIG. 5 in the comparative example in that the planarization film 30 is formed in the through-hole 130 and the columnar spacer 10 is disposed above the through-hole 130. The configuration of FIG. 10 limits movement of the columnar spacer 10 within the through-hole 130, and thus displacement between the TFT substrate 100 and the counter substrate 200 is suppressed.

Although the above description has been given with reference to the main columnar spacer 10, the same applies to the sub-columnar spacer 20. Specifically, the sub-columnar spacer 20 is not in contact with the TFT substrate 100 in the normal state, but if stress is applied from the outside so as to cause displacement between the TFT substrate 100 and the counter substrate 200, the sub-columnar spacer 20 comes into contact with the TFT substrate 100 side, and thus displacement between the TFT substrate 100 and the counter substrate 200 is suppressed according to the same principle as in the case of the main columnar spacer 10.

Figure 11:
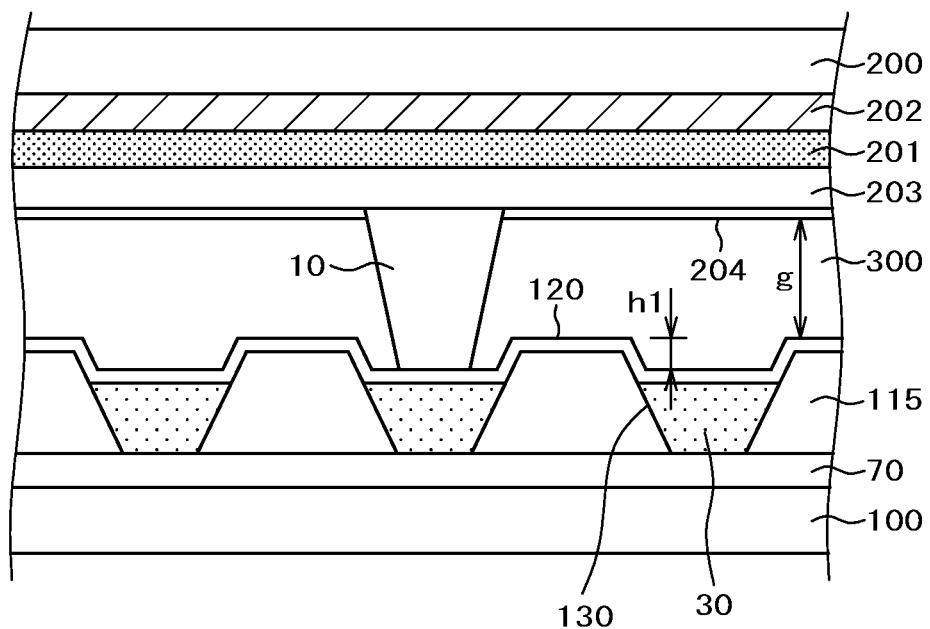
FIG. 11 is a cross sectional diagram showing an effect of the first embodiment.

FIG. 11 is a cross sectional view of main parts of the invention. FIG. 11 corresponds to FIG. 6 in the comparative example. FIG. 11 differs from FIG. 6 in that the planarization film 30 is formed within the through-hole 130 formed in the organic passivation film 115, the alignment film 120 is formed on the planarization film 30, and the columnar spacer 10 is disposed in contact with the alignment film 120 in the through-hole 130.

In FIG. 11, the planarization film 30 is not formed up to the upper end of the through-hole 130, but rather a recess is formed in an upper portion of the through-hole 130. The columnar spacer 10 is therefore restricted to move only within the recess, and lateral displacement between the TFT substrate 100 and the counter substrate 200 is suppressed. In FIG. 11, the recess has a depth h1 of 0.4 to 0.8 µm, for example. A distance g between the TFT substrate 100 and the counter substrate 200, i.e., thickness g of the liquid crystal layer 300 is 1.8 to 2 µm. On the other hand, the organic passivation film 115 has a thickness of 2 to 4 µm.

For example, if the liquid crystal layer 300 has a thickness of 2 µm and the organic passivation film 115 has a thickness of 2 µm, the columnar spacer 10 has a very large height of 4 µm without the planarization film 30. On the other hand, when a planarization film is used as in the invention, and when the recess h1 formed in the through-hole 130 has a depth of, for example, 0.4 µm, the height of the columnar spacer 10 is reduced to 2.2 µm, leading to a reduction in load on the manufacturing process.

FIG. 11 is a plan view of a portion where the columnar spacer 10 is in contact with the bottom of the recess. When the recess has a planar shape of a square and has a side length dr in that portion, and when the columnar spacer 10 has a diameter d1, the columnar spacer 10 can move only in a range of (dr−d1)/2. Consequently, lateral displacement between the TFT substrate 100 and the counter substrate 200 can also be controlled within the range.

Figure 12:
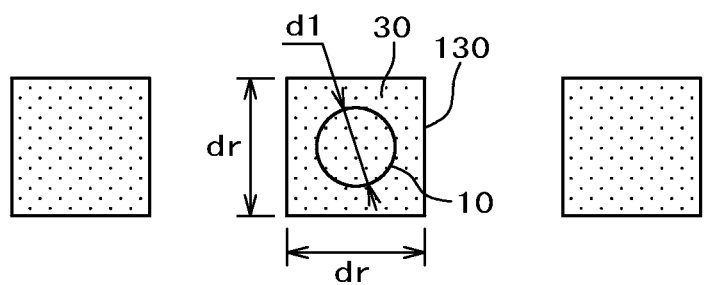
FIG. 12 is a plan diagram showing a relationship between a through-hole, a planarization film, and a columnar spacer corresponding to those in FIG. 11.

FIGS. 11 and 12 show an example where the planarization film 30 is formed only within the through-hole 130. However, the planarization film can also be used as a planarization film 30 in the vicinity of the through-hole 130. Specifically, the through-hole 130 is formed in the thick organic passivation film 115 and thus has a large diameter. In a portion where the through-holes 130 are adjacent to each other, the through-holes 130 may interfere with each other, leading to a reduction in thickness of the organic passivation film 115 between the through-holes 130.

Figure 13:
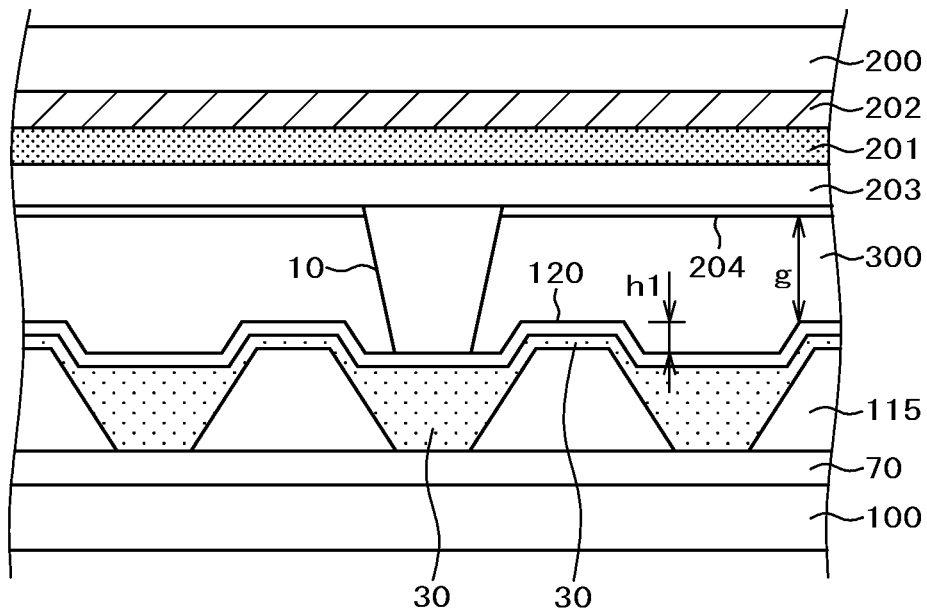
FIG. 13 is a cross sectional diagram showing another aspect of the first embodiment.
Figure 14:
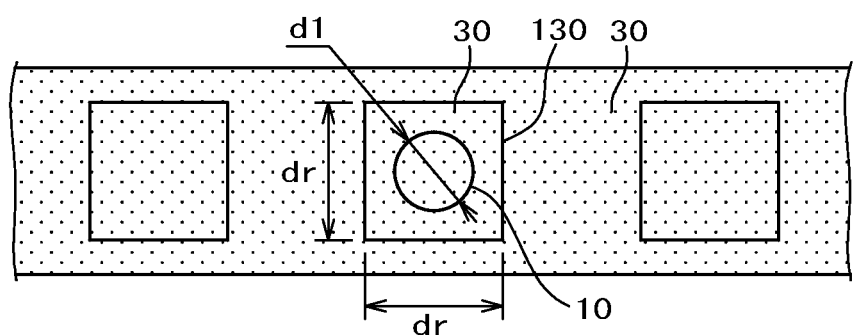
FIG. 14 is a plan diagram showing a relationship between a through-hole, a planarization film, and a columnar spacer corresponding to those in FIG. 13.

FIG. 13 is a cross sectional diagram showing a configuration to deal with such an issue, and FIG. 14 is a plan diagram corresponding to FIG. 13. In FIGS. 13 and 14, the planarization film 30 is formed in a horizontal stripe form so as to cover a plurality of through-holes 130. Although the portion where the planarization film 30 is formed is planarized, since the through-hole 130 is deep, a recess is formed at the through-hole portion. Depth h1 of the recess can be determined by viscosity of the planarization film material when the material is applied, drying conditions in a leveling furnace, etc.

FIG. 14 is a plan diagram corresponding to FIG. 13. In FIG. 14, the planarization film 30 is formed in a horizontal stripe form and covers a plurality of through-holes 130. The surface of the planarization film 30 in the through-hole 130 is lower than the surface of the planarization film in any other portion. In other words, the recess is formed in a rectangular shape. The columnar spacer 10 having a diameter d1 is in contact with the TFT substrate 100 side within this recess. In FIG. 14, assuming that length of the side of the recess is dr and diameter of the columnar spacer 10 is d1, the columnar spacer 10 can only move within a range of (dr−d1)/2. Hence, lateral displacement between the TFT substrate and the counter substrate can also be controlled within the range. This effect is the same as that of the configuration of FIGS. 11 and 12.

Figure 15:
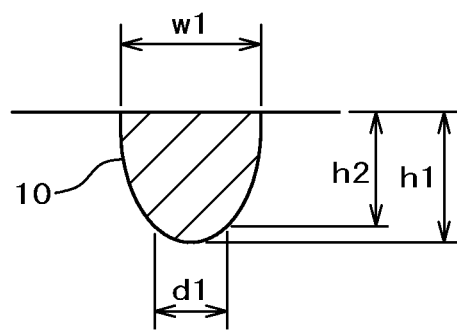
FIG. 15 is a cross sectional diagram showing an example of a columnar spacer.

Although the above description has been made assuming the columnar spacer 10 has a trapezoidal longitudinal cross-sectional shape for the sake of clarity, an actual columnar spacer does not have such a regular trapezoidal shape. FIG. 15 shows an example of a columnar spacer 10 having a protrusion shape, for example. In FIG. 15, for example, the protrusion has a root diameter w1 and an elliptical cross section. The shape of FIG. 15 makes it possible to measure height of the tip end of the protrusion relatively easily. However, it is difficult to measure the diameter d1 of the tip end of the protrusion. In such a case, width at a height of 90% of the height h1 of the protrusion may be used as the diameter d1 of the protrusion.

The above description has been given with reference to the main columnar spacer 10. The same applies to the sub-columnar spacer 20. The sub-columnar spacer 20 is normally not in contact with the TFT substrate 100, but if displacement occurs between the TFT substrate 100 and the counter substrate 200, or if stress such as pressing force is applied to the TFT substrate 100 or the counter substrate 200. In this case, since the sub-columnar spacer 20 also comes into contact with the TFT substrate 100, the same phenomenon as with the main columnar spacer 10 occurs.

The common electrode top structure has been explained hereinbefore. The liquid crystal display devices also include the pixel electrode top structure. In such case, the through-hole 130 is also formed in the organic passivation film 115, and the pixel electrode is connected to the source electrode of the TFT in the through-hole 130 as in the case of the common electrode top. Hence, the configuration of the first embodiment described with FIGS. 11 to 15 can be directly applied to the case of the pixel electrode top.

Second Embodiment

The color filter 201 and the black matrix 202 are typically formed on the counter substrate 200 side. The color filter 201 or the black matrix 202 may be displaced from the pixel formed on the TFT substrate 100 side in plan view depending on alignment precision when the TFT substrate 100 is combined with the counter substrate 200. In a high-definition screen, alignment precision of such a degree may become an issue. To prevent such an issue, the second embodiment provides a configuration where a color filter 201 is formed on the TFT substrate 100 side, and a light shielding film is formed in place of the black matrix 202. Such a configuration is called color filter on array (COA). The COA may refer to both the case where only the color filter 201 is formed on the TFT substrate 100 side while the black matrix 202 is formed on the counter substrate 200, and the case where both the color filter 201 and the black matrix 202 are formed on the TFT substrate 100.

Figure 16:
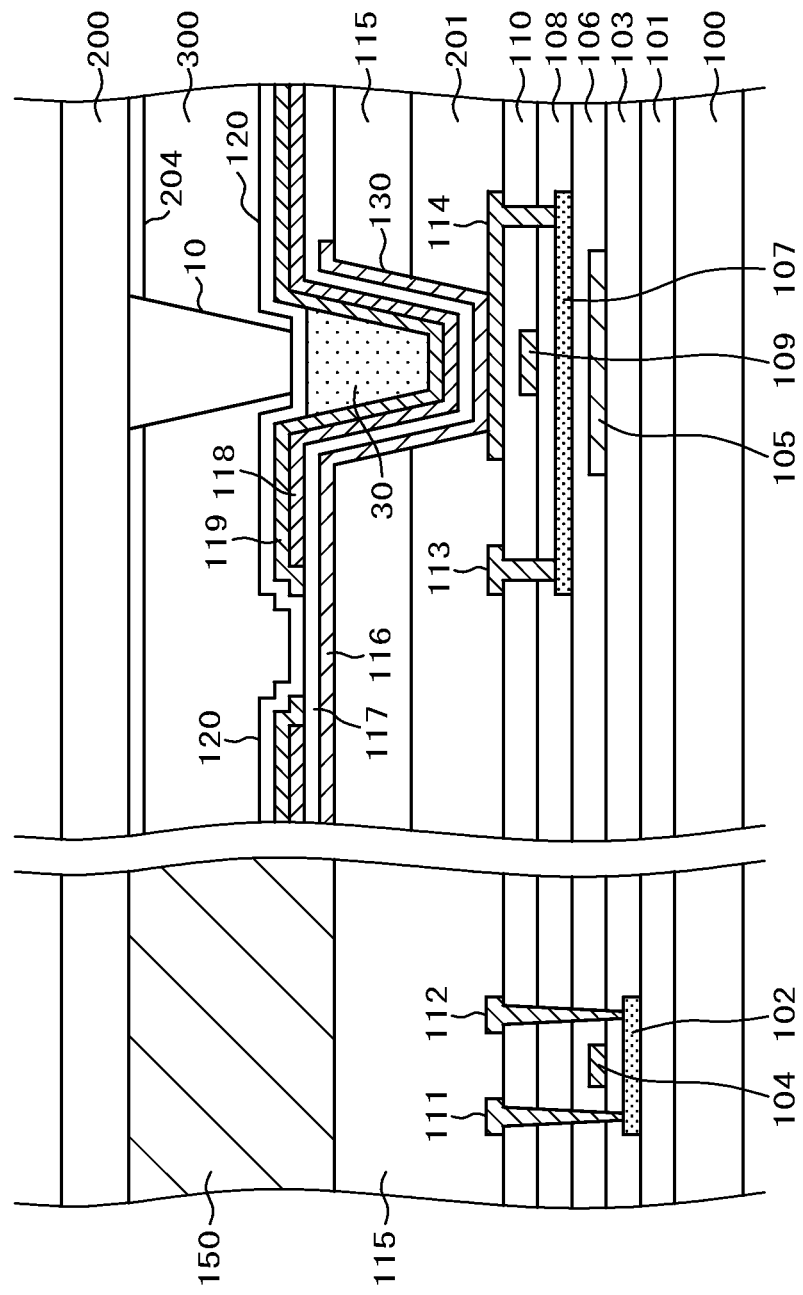
FIG. 16 is a cross sectional view of a liquid crystal display device according to a second embodiment.

FIG. 16 is a cross-sectional diagram showing the case where the invention is applied to the COA. FIG. 16 differs from FIG. 9 in the first embodiment in that the color filter 201 is formed under the organic passivation film 115, the second light-shielding film 118 formed of metal serves as the black matrix, and only the alignment film and the columnar spacer 10 are formed on the counter substrate 200 while the color filter 201, the black matrix 202, the overcoat film 203, and the like are not formed thereon. However, a light shielding film is formed on the frame portion of the counter substrate 200.

In FIG. 16, the through-hole 130 is formed through the organic passivation film 115 and the color filter 201. The planarization film 30 is formed inside the through-hole 130. FIG. 16 is the same as FIG. 9 in the first embodiment in that the columnar spacer 10 is disposed in the recess formed by the planarization film 30 and the through-hole 130. This configuration also provides the same effect as that described with FIGS. 11 to 15 in the first embodiment.

Figure 17:
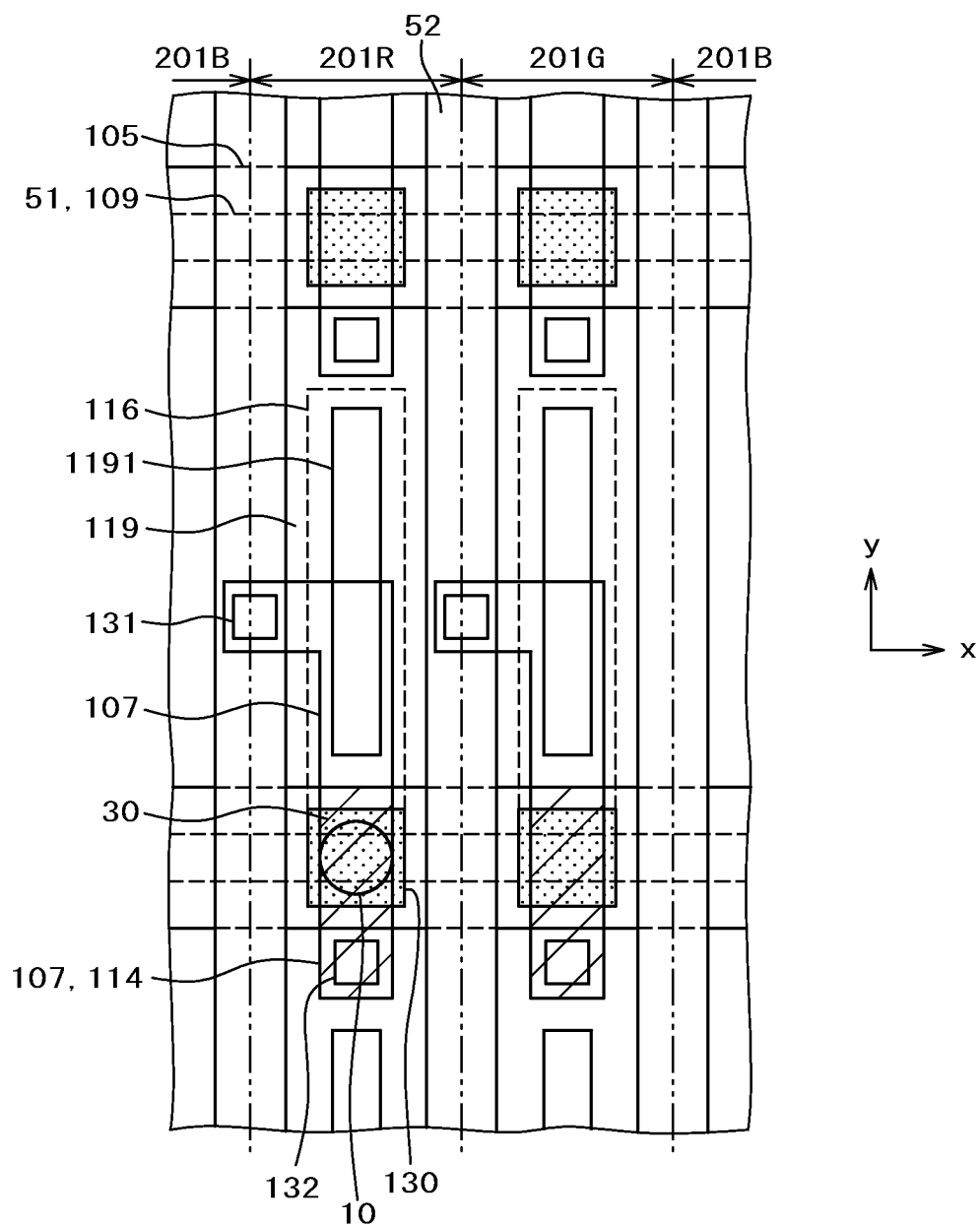
FIG. 17 is a plan diagram corresponding to FIG. 16.

FIG. 17 is a plan view of the TFT substrate 100 corresponding to FIG. 16. FIG. 17 differs from FIG. 10 in the first embodiment in that the red color filter 201R, the green color filter 201G, and the blue color filter 201B are formed in correspondence to respective pixels. The red color filter 201R, the green color filter 201G, and the blue color filter 201B are each formed in a stripe form in the vertical direction (y direction).

The planarization film 30 and the recess formed in the through-hole 130, and the columnar spacer 10 disposed in the recess are each have the same configuration as that of FIG. 10 in the first embodiment. The configurations of FIGS. 11 to 15 described in the first embodiment therefore can also be applied to the COA configuration.

Although the pixel structure in FIGS. 16 and 17 is a common electrode top configuration in the COA, the pixel structure can also be applied to the case of the pixel electrode top.

What is claimed is:

1. A liquid crystal display device, comprising a thin film transistor (TFT) substrate and a counter substrate that are disposed opposite to each other with a liquid crystal layer in between, the TFT substrate having, an organic passivation film formed covering the TFT including a semiconductor film, a gate electrode, a drain electrode, and a source electrode, and a pixel electrode and a common electrode formed on the organic passivation film, the organic passivation film having a through-hole to connect the pixel electrode and the TFT,
wherein a columnar spacer is formed on the counter substrate to define a distance between the TFT substrate and the counter substrate,
a planarization film is formed in the through-hole,
a recess is formed in the through-hole by a surface of the planarization film and a sidewall of the through-hole,
a tip end of the columnar spacer exists in the recess,
the planarization film exists also outside the through-hole, and thickness of the planarization film inside the through-hole is greater than thickness of the planarization film outside the through-hole, and
an upper surface of the planarization film inside the through-hole is lower than an upper surface of the planarization film outside the through-hole.

2. The liquid crystal display device according to claim 1, wherein the columnar spacer is in contact with the recess.

3. The liquid crystal display device according to claim 1, wherein the columnar spacer is not in contact with the recess.

4. The liquid crystal display device according to claim 3, wherein the columnar spacer comes into contact with the recess when the TFT substrate or the counter substrate receives pressing force.

5. The liquid crystal display device according to claim 1, wherein diameter of the recess is larger than diameter of the columnar spacer in plan view.

6. The liquid crystal display device according to claim 1, wherein depth of the recess is 0.4 to 0.8 µm.

7. The liquid crystal display device according to claim 1, wherein the planarization film is formed of the same material as the organic passivation film.

8. The liquid crystal display device according to claim 1, wherein the columnar spacer, the planarization film, the through-hole, the gate electrode, and the semiconductor film overlap one another in plan view.

9. The liquid crystal display device according to claim 1, wherein the semiconductor film is formed of oxide semiconductor.

10. The liquid crystal display device according to claim 1, wherein color filters are formed on a side of the TFT substrate.

11. The liquid crystal display device according to claim 1, wherein a light shielding film including a metal film is formed overlapping the common electrode.

12. The liquid crystal display device according to claim 11, wherein no black matrix exists in a display region of the counter substrate.

13. The liquid crystal display device according to claim 1, the planarization film is made of resin.

* * * * *